United States Patent
Raman et al.

(10) Patent No.: US 12,210,103 B2
(45) Date of Patent: Jan. 28, 2025

(54) SPURIOUS SPACE VEHICLE DETECTION VIA EXPLOITING KNOWLEDGE OF KNOWN BITS

(71) Applicant: Samsung Electronics Co., Ltd., Suwon-si (KR)

(72) Inventors: Sundar Raman, Fremont, CA (US); Raul H. Etkin, Sunnyvale, CA (US); Jamie A. Henriksen, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 351 days.

(21) Appl. No.: 17/880,621

(22) Filed: Aug. 3, 2022

(65) Prior Publication Data

US 2023/0296782 A1 Sep. 21, 2023

Related U.S. Application Data (60) Provisional application No. 63/322,218, filed on Mar. 21, 2022.

(51) Int. Cl.
*G01S 19/07* (2010.01)
*G01S 19/11* (2010.01)

(52) U.S. Cl.
CPC ............. *G01S 19/07* (2013.01); *G01S 19/115* (2019.08)

(58) Field of Classification Search
CPC .............................. G01S 19/07; G01S 19/115
See application file for complete search history.

(56) References Cited

U.S. PATENT DOCUMENTS

| | | |
|---|---|---|
| 6,512,803 B2 | 1/2003 | Heinzl et al. |
| 7,372,400 B2 | 5/2008 | Cohen et al. |
| 7,956,805 B2 | 6/2011 | Pon |
| 8,022,869 B2 | 9/2011 | Wu et al. |
| 8,184,046 B2 | 5/2012 | Bickerstaff et al. |
| 9,176,217 B2 | 11/2015 | Krasner et al. |
| 9,857,476 B2 | 1/2018 | Mathews et al. |

(Continued)

OTHER PUBLICATIONS

Harms, Joel K., "Synthetic Aperture Digital Beamsteering Array for Global Positioning System Interference Mitigation: A Study on Array Topology," Master's Thesis, Texas A & M University, 2014, 253 pages.

(Continued)

*Primary Examiner* — Freshteh N Aghdam
(74) *Attorney, Agent, or Firm* — Renaissance IP Law Group LLP (57) ABSTRACT

A system and a method are disclosed for detecting a spurious signal in a Global Navigation Satellite System (GNSS) receiver. A detector of the GNSS receiver determines a first sequence of known bits or known-bit transitions of a space vehicle (SV) signal of a target SV. A second sequence is determined based on a coherent sum of the SV signal being tracked by the GNSS receiver. A first reliability sequence may be associated with the first sequence, and a second reliability sequence that may be associated with the second sequence. A correlation statistic of the first sequence is determined based on the second sequence. Whether the first SV signal is a spurious signal is determined based on a comparison of the correlation statistic to a threshold value.

20 Claims, 5 Drawing Sheets

(56) References Cited

U.S. PATENT DOCUMENTS

| | | | |
|---|---|---|---|
| 9,864,065 B2 | 1/2018 | Rao | |
| 10,416,316 B1 | 9/2019 | Wang et al. | |
| 10,424,205 B2 | 9/2019 | Zhu et al. | |
| 10,746,882 B2 | 8/2020 | Lennen | |
| 10,775,510 B2 | 9/2020 | Agee | |
| 11,579,308 B2* | 2/2023 | Zangvil | G01S 19/29 |
| 2010/0117884 A1* | 5/2010 | Ahmed | G01S 19/22 |
| | | | 342/14 |
| 2017/0070971 A1 | 3/2017 | Wietfeldt et al. | |
| 2017/0357008 A1* | 12/2017 | Sagiraju | G01S 19/22 |
| 2020/0064490 A1 | 2/2020 | Lennen | |
| 2020/0096647 A1* | 3/2020 | Cookman | H04J 13/0022 |
| 2020/0371247 A1 | 11/2020 | Marmet | |
| 2021/0333410 A1 | 10/2021 | Gum et al. | |
| 2021/0373179 A1* | 12/2021 | McBurney | G01S 19/46 |
| 2021/0405213 A1 | 12/2021 | Tuck et al. | |
| 2022/0137236 A1* | 5/2022 | Conflitti | G01S 19/36 |
| | | | 342/357.25 |

OTHER PUBLICATIONS

Krumvieda, Kent, et al., "A Complete IF Software GPS Receiver: A Tutorial about the Details," Proceedings of the 14th International Technical Meeting of the Satellite Division of The Institute of Navigation (ION GPS 2001), 2001, 22 pages.

* cited by examiner

SPURIOUS SPACE VEHICLE DETECTION VIA EXPLOITING KNOWLEDGE OF KNOWN BITS

CROSS-REFERENCE TO RELATED APPLICATION

This application claims the priority benefit under 35 U.S.C. § 119(e) of U.S. Provisional Application No. 63/322,218, filed on Mar. 21, 2022, the disclosure of which is incorporated herein by reference in its entirety.

TECHNICAL FIELD

The subject matter disclosed herein relates to enhancing Global Navigation Satellite Systems (GNSS) measurements. More particularly, the subject matter disclosed herein relates to a system and a method for verifying a GNSS space vehicle (SV) signal based on known-bit patterns of an SV signal.

BACKGROUND

GNSS receivers may be subject to various sources of interference that may adversely affect receiver performance. The interference may come from various potential sources, both internal and external to a receiver. Example interference sources range from cellular transmissions (both in-band and out-of-band), other components of the GNSS receiver (such as a display interface or an application processor), and other components within the same System on a Chip (SoC). Interference may be narrowband, usually called CW interference, or wideband.

GNSS receivers may use different techniques to mitigate the adverse effects of interference. Examples range from CW detectors and tone cancellers, blanking, notch filters (via, e.g., FFT), etc. In accordance with contemporary interference mitigation techniques used, sometimes a GNSS receiver may identify spurious signals as valid space vehicle (SV) transmissions (typically called fake or ghost SVs), which results in performance degradation. GNSS receivers may also use various techniques to detect the spurious transmissions by utilizing properties of valid SV transmissions, such as time-domain and frequency-domain characteristics of valid correlation peaks. A detector is subject to various detector errors, called misdetections and false alarms. Due to the detector errors, valid SV transmissions may sometimes be removed (false alarms), and sometimes invalid SV transmissions may pass undetected (misdetections).

SUMMARY

An example embodiment provides a method to detect a spurious signal in a GNSS receiver in which the method may include: determining, by a detector circuit of the GNSS receiver, a first sequence that may include known-bit data of a SV signal of a target SV being tracked by the GNSS receiver; determining, by the detector circuit, a second sequence based on multiple coherent sums of the SV signal; generating, by the detector circuit, a correlation statistic of the first sequence based, at least in part, on the second sequence; and verifying, by the detector circuit, whether the SV signal is a spurious signal based, at least in part, on a comparison of the correlation statistic to a threshold value. In one embodiment, determining the first sequence may further include determining, by the detector circuit, a first reliability sequence associated with the first sequence, and generating the correlation statistic may be further based, at least in part, on the first reliability sequence associated with the first sequence. In another embodiment, determining the second sequence further may include determining, by the detector circuit, a second reliability sequence that is associated with the second sequence, and generating the correlation statistic may be further based, at least in part, on the second reliability sequence. In still another embodiment, the known-bit data comprises one or more of known bits or known-bit transitions. In yet another embodiment, the threshold value is based at least in part on one or more of a number of SVs being tracked by the GNSS receiver, the known-bit data, a carrier-to-noise-density ratio of the SV signal of the target SV, an uncertainty of a frame synchronization, information obtained from other spurious signal checks performed by the GNSS receiver, continuous wave activity, or temperature dynamics. In one embodiment, the known-bit data may include Telemetry and a Handover Word words of a current subframe of the SV signal. In another embodiment, the known-bit data further may include known-bit data of a parity field of a subframe immediately preceding the current subframe of the SV signal. In still another embodiment, the known-bit data may correspond to multiple subframes of the SV signal.

An example embodiment provides a GNSS receiver that may include a front end circuit configured to receive a plurality of SV signals, and a detector circuit. The detector circuit may be configured to: determine a first sequence that may include known-bit data of a SV signal of a target SV being tracked by the GNSS receiver, determine a second sequence based on multiple coherent sums of the SV signal, generate a correlation statistic of the first sequence based, at least in part, on the second sequence; and verify that the SV signal is a spurious signal based, at least in part, on a comparison of the correlation statistic to a threshold value. In one embodiment, the detector circuit may be further configured to determine a first reliability sequence associated with the first sequence, and generate the correlation statistic further based, at least in part, on the first reliability sequence associated with the first sequence. In another embodiment, the detector circuit may be further configured to determine a second reliability sequence that is associated with the second sequence, and generate the correlation statistic further based, at least in part, on the second reliability sequence. In still another embodiment, the known-bit data may include one or more of known bits that are not contiguous in the SV signal or known-bit transitions that are not contiguous in the SV signal. In yet another embodiment, the threshold value may be based at least in part on one or more of a number of SVs being tracked by the GNSS receiver, the known-bit data, a carrier-to-noise-density ratio of the SV signal of the target SV, an uncertainty of a frame synchronization, information obtained from other spurious signal checks performed by the GNSS receiver, continuous wave activity, or temperature dynamics. In one embodiment, the known-bit data may include Telemetry and a Handover Word words of a current subframe of the SV signal. In another embodiment, the known-bit data may include at least one bit or bit transition of a parity field of a subframe immediately preceding the current subframe of the SV signal. In still another embodiment, the known-bits data may correspond to multiple subframes of the SV signal.

An example embodiment provides a detector circuit for a GNSS receiver that may include a processor, and one or more computer-readable storage mediums storing a set of executable computer-program instructions in which the one or more computer-program instructions, when executed by the processor, causes the processor to determine a first sequence comprising known-bit data of a SV signal of a target SV being tracked by the GNSS receiver, determine a second sequence based on multiple coherent sums of the SV signal, generate a correlation statistic of the first sequence based, at least in part, on the second sequence, and verify whether the SV signal is a spurious signal based, at least in part, on a comparison of the correlation statistic to a threshold value. In one embodiment, determining the first sequence may further include determining, by the detector circuit, a first reliability sequence associated with the first sequence, and generating the correlation statistic may be further based, at least in part, on the first reliability sequence associated with the first sequence. In another embodiment, determining the second sequence further may include determining, by the detector circuit, a second reliability sequence that may be associated with the second sequence, and generating the correlation statistic may be further based, at least in part, on the second reliability sequence. In still another embodiment, the known-bit data may include one or more of known bits or known-bit transitions.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a detector that detects invalid SV signals by using knowledge of "known-bits" of valid GNSS signals. GNSS data channel signals carry information (bits) that have a structure that is not present in spurious signals. The information structure may be used to derive correlation statistics that exhibit different statistical properties depending on whether a signal under consideration is a valid SV transmission or a spurious transmission. The difference in statistical behavior may be used by a detector disclosed herein that differentiates valid SV transmissions from signals arising from interference. The detector disclosed herein improves techniques used to mitigate negative effects of spurious signals. Moreover, detectors disclosed herein used alone or in combination with other interference mitigation and detection techniques provide for improved GNSS receiver performance. An advantage provided by the detector(s) disclosed herein is that new SV signal features, which are not used by complementary spurious signal detectors, may be used to complement existing spurious signal detectors and enhance the system performance.

Figure 1:
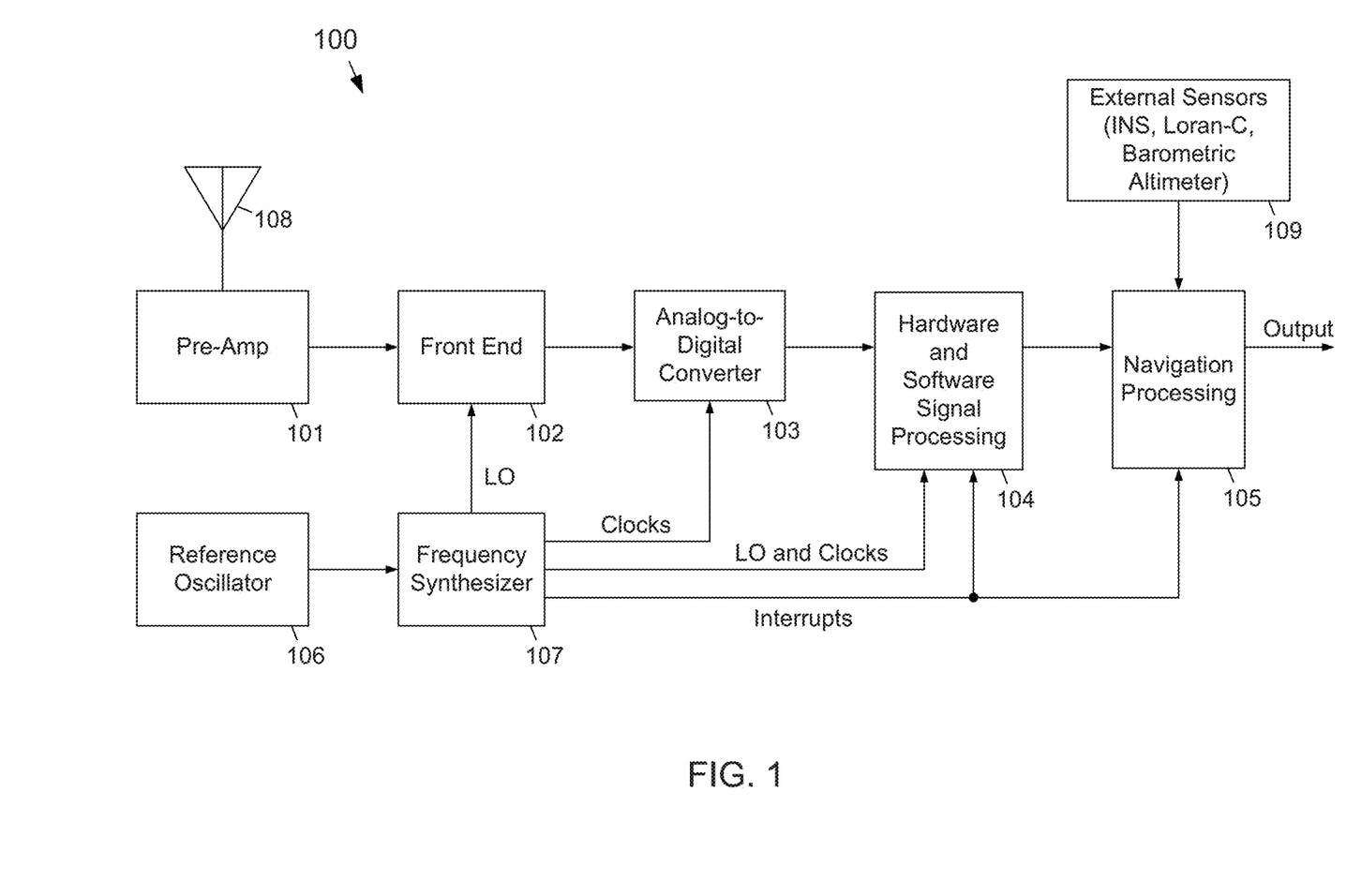
FIG. 1 is a block diagram of an example embodiment of a GNSS receiver that may verify a GNSS SV signal based on known-bit patterns of an SV signal according to the subject matter disclosed herein.

FIG. 1 is a block diagram of an example embodiment of a GNSS receiver 100 that may verify a GNSS SV signal based on known-bit patterns of an SV signal according to the subject matter disclosed herein. The GNSS receiver 100 includes a pre-amp circuit 101, a front end circuit 102, an analog-to-digital converter (ADC) circuit 103, a hardware/software (HW/SW) signal processing circuit 104, a navigation processing circuit 105, a reference oscillator circuit 106 and a frequency synthesizer circuit 107. An antenna 108 may be coupled to the pre-amp circuit 101 and receives GNSS signals from SVs (not shown). One or more external sensors 109, such as but not limited to an inertial navigation system (INS), Loran-C and/or a barometric altimeter, may be coupled to the navigation processing circuit 105. The example GNSS receiver 100 may include more or fewer components that are depicted in FIG. 1. In one embodiment, each of the various components depicted in FIG. 1 for the example GNSS receiver 100 may be formed from one or more modules.

The pre-amp circuit 101 amplifies and/or filters the GNSS signals received by the antenna 108. An output from the pre-amp circuit 101 may be input to the front end circuit 102 where the received GNSS signals may be down-converted to baseband signals. A reference oscillator circuit 106 may generate a reference frequency signal that is input to the frequency synthesizer circuit 107. The frequency synthesizer circuit 107 may output a local oscillator (LO) signal that is input to the front end circuit 102. The frequency synthesizer circuit 107 may also output other LO signals, clock signals and interrupt signals that are input to other components of the GNSS receiver 100.

The baseband signals output from the front end circuit 102 may be input to the ADC circuit 103 to convert the baseband signals to digital signals. The output of the ADC circuit 103 is input to the HW/SW signal processing circuit 104, which outputs determined and/or computed information, such as but not limited to, pseudoranges, delta ranges, carrier phase and navigation data. In addition to or alternatively to Weak Frame Sync (WFS) processing and Extremely Weak Frame Sync (EWFS) processing, the HW/SW signal processing circuit 104 may perform verification processing as disclosed herein. The navigation processing circuit 105 may use the outputs from the HW/SW signal processing circuit 104 to generate navigation-related information, such as but not limited to, position, velocity, time, and fault detection and isolation signals.

Known Bits and Known-Bit Transitions

Data channels of GNSS signals contain information that is typically decoded at a GNSS receiver, and considered to be unknown prior to being decoded. Some of the information, however, may be estimated or predicted prior to decoding, or predicted in subsequent transmissions after decoding. When the information is encoded in binary form, each discrete piece of information may be referred to as a bit. As used herein, the term "bit" is used to refer to any information quantum, regardless whether the actual encoding is binary or not. The term "known-bit" is used herein to indicate information may be predicted at a receiver.

Depending on the signal structure, the encoding used, and the receiver capabilities, there may be a phase ambiguity in an incoming bit stream as estimated by the receiver. When such an ambiguity exists, "bit transitions" instead of the actual bit values may be used for the technique disclosed herein. That is, in a contiguous stream of known bits, there may be some ambiguity regarding the phase of the bit stream sequence and regarding the phase of each individual bit. For example, a bit value of the initial bit may not be known, but once the bit has been assumed to be either a 1 or a 0, the rest of the bit stream may be assumed to be known. Furthermore, a GNSS receiver may not be able to track the carrier phase of the signal transmission, in which case the phase of each bit may drift from bit to bit. Accordingly, even if the phase of the first bit is known, it is possible that the phase of subsequent bits remains unknown. In such cases, bit transitions instead of bit values may be used. "Known-bits" or "known-bit-transitions" may be used interchangeably herein to refer to the corresponding property of the incoming data stream that may be used by the technology disclosed herein. The term "known-bit data" may refer to data that relates to known-bit information, and may be used to represent data such as known bits, known-bit transitions, signal transmissions representing known bits, etc., alone or in combination.

One example of known bits (transitions) are some (or all) of the bits in the Telemetry (TLM) and Handover Word (HOW) words in GPS transmissions, which have been successfully used in the Weak Frame Sync (WFS) and Extremely Weak Frame Sync (EWFS) algorithms for frame synchronization. While knowledge of the bits (transitions) may be used, it should be noted that the technique disclosed herein applies to any information bits (transitions) that may be estimated at the receiver, possibly including other GNSS constellations in addition to GPS, and other bits possibly beyond the bits of the TLM and HOW words. Methods for estimating these bits (transitions) may use information obtained from external aiding sources (e.g., ephemeris assistance servers), other GNSS transmissions, or prior GNSS transmissions from the same SV.

As disclosed herein, the known bits (transitions) in the TLM and HOW word are used in one example embodiment to describe the technique disclosed herein, observing that the example should not be considered as a limitation.

References to WFS and EWFS formula relate to the frame synchronization application, but may be interpreted in the context of any other statistic that may be used for spurious SV detection. That is, WFS and EWFS formulas should be only be interpreted as examples of statistics that use knowledge of the bit transitions, and the technique disclosed herein should not be limited to only those specific statistics used by WFS and EWFS.

Known-Bit Transitions

There are two sets of known-bit transitions used for weak frame synchronization correlations. The first set of correlations is the weak frame sync (WFS) and the second is the extremely weak frame sync (EWFS). The WFS correlations use the GPS preamble, Z Count, subframe number and parity zeroes in the Telemetry (TLM) and Hand Over Word (HOW) words.

Figure 2A:
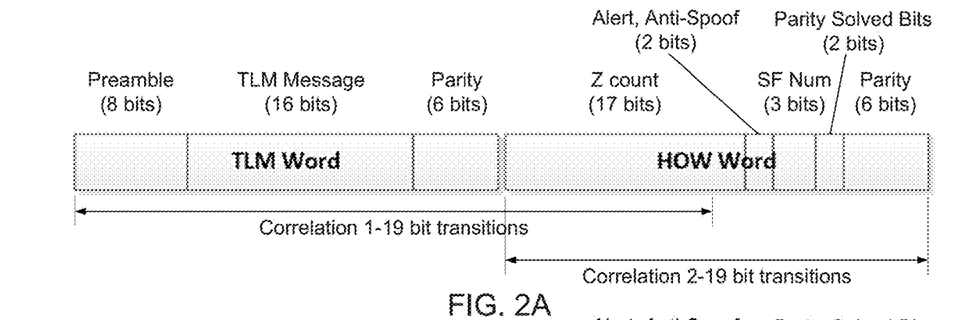
FIG. 2A shows an example bit sequence for the Telemetry and Handover Word words of a SV transmission.

FIG. 2A shows an example bit sequence for the TLM and HOW words of a SV transmission. The TLM word includes an 8-bit preamble field, a 16-bit TLM message field and a 6-bit parity field for 19 bit transitions that may be used for correlation. The HOW word includes a 17-bit Z count field, a 2-bit Alert and Anti-Spoof field, a 3-bit Sub-Frame (SF) number field, a 2-bit Parity Solved Bits field, and a 6-bit parity field for 18 bit transitions (bits 2-19) that may be used for correlation.

To predict the correct Z Count and subframe number, the system time must be known to within 3 seconds of uncertainty. In the example embodiment, however, an uncertainty limit of 2.8 seconds is used to provide an extra margin for error. A total of 30 bits of predicted data are available for the correlation, but because the 30 bits are not all contiguous, there are only 26 bit transitions that are used for the correlation.

The 26-bit transitions for WFS correlations are split into two separate 19-bit transitions correlations, with an overlap on the Z count field. The two correlations are then added together to obtain one WFS correlation value that has a range of 0 to 256.

Figure 2B:
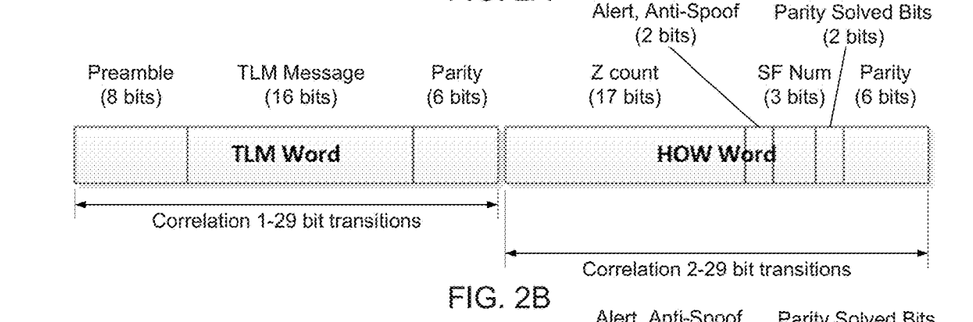
FIG. 2B shows an example known-bit correlations used for EWFS.

The EWFS correlations predict the entire 60 bits of the TLM and HOW words. In addition to the WFS known bits, the EWFS correlations predict the TLM message and the alert and anti-spoof bits. With these bits known, the predicted parity may be computed for both words. The TLM message may be assumed to be the current GPS week number plus some zeroes, and the alert and anti-spoof bits are assumed to be 0 and 1, respectively. FIG. 2B shows the known-bit correlations used for EWFS.

The bit transitions are split into two separate 29-bit transitions, with no overlap. The two correlations are then added together to obtain one EWFS correlation value that has a range of 0 to 256.

Additional Known Bits

Figure 3:
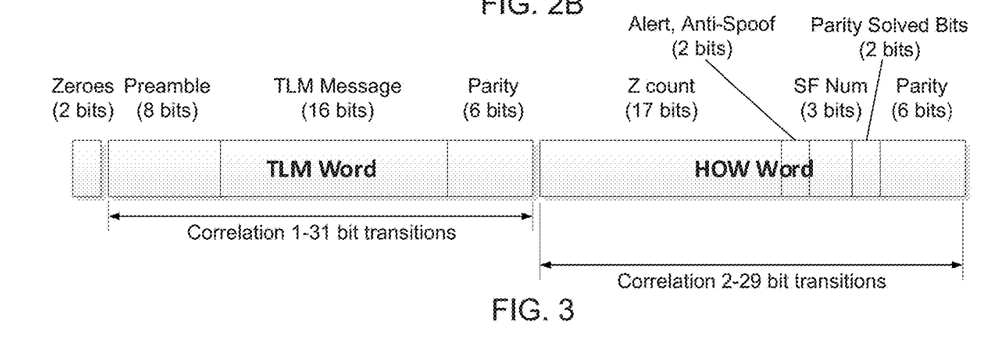
FIG. 3 shows two additional zero bits from the parity of Word 10 of the previous subframe prior to the GPS preamble.

FIG. 3 shows two additional zero bits from the parity of Word 10 of the previous subframe prior to the GPS preamble. The GPS-ICD guarantees that these two bits to be zero. As they are contiguous with the preamble, these two bits add two more bit transitions that are easily available for a correlation.

The other parts of the GPS frame may have predictable bits that may be used. For example, when aided ephemeris is provided, the ephemeris and almanac bits may be predicted to some degree. Including these known bits may be more complicated to use for correlations.

Correlation Statistics

Figure 4:
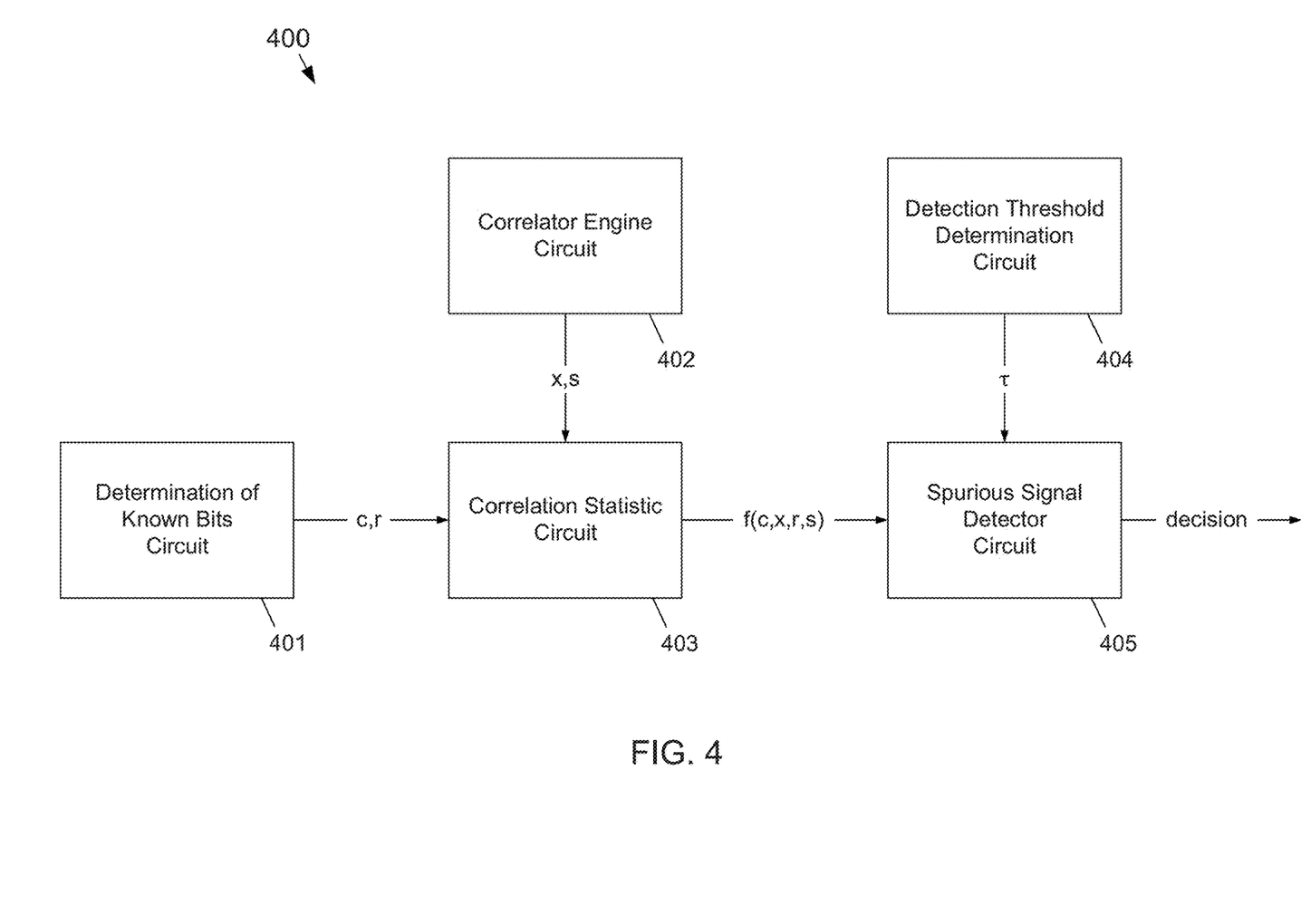
FIG. 4 is a block diagram of an example embodiment of a detector for a GNSS receiver that detects spurious signals using known bits in the GNSS data stream according to the subject matter disclosed herein.

The known-bit and/or known-bit transitions described above may be used to compute a statistic (metric) that has different statistical properties when applied to valid SV transmissions and applied to spurious transmissions. The difference in statistical properties may be used to form a detector, an example block diagram of which is depicted in FIG. 4.

Let $x=[x_1, x_2, \ldots, x_T]$ be a complex sequence that may be an output of the GNSS correlator. In the GPS-L1 case, each $x_i$ is the output of the 20 ms coherent sum corresponding to the target SV. A GNSS receiver typically uses tracking loops that track the frequency and/or phase of an incoming signal as well as the code phase. The sequence x benefits from all the tracking loops to enhance the signal quality when applied to valid SV transmissions. Let $c=[c_1, c_2, \ldots, c_T]$ be a sequence associated with the known information. When the information is binary, each $c_i \in \{0,1\}$ or $c_i \in \{-1,1\}$. Both sequences contain T symbols. In general, the T symbols need not appear contiguously in the incoming data stream.

A correlation statistic $f(x, c)$ may be defined as any deterministic function of x and c. Out of all possible deterministic functions $f(x, c)$, functions of interest exhibit different statistical behaviors when applied to random sequences x, depending on whether x corresponds to a valid SV transmission (which is correlated with the information sequence c) and a spurious transmission (which is uncorrelated with the information sequence c). Many correlation statistics are possible, with various features that may make them desirable in some applications. For example, in the simplest setting, it may be assumed that $|x_i|$ is constant, $x_i$ has a zero mean, the carrier phase is tracked perfectly, and the initial phase of the sequence x is known. The zero mean assumption for x implies that the information sequence c may be encoded with symbols in $\{-1,1\}$. In this (idealized) case, the following correlation statistic may be appropriate:

$$f_1(x, c) = \frac{1}{T}\left|\sum_{i=1}^{T} x_i^* \cdot c_i\right| \quad (1)$$

in which (*) denotes a complex conjugate.

When $|x_i|$ cannot be assumed to be constant, but approximately invariant during the transmission, the following normalized metric may be more desirable:

$$f_2(x, c) = \frac{\left|\sum_{i=1}^{T} x_i^* \cdot c_i\right|}{\sqrt{\sum_{i=1}^{T} |x_i|^2} \cdot \sqrt{\sum_{i=1}^{T} |c_i|^2}}. \quad (2)$$

When the sequences x and c cannot be assumed to have a zero mean, the following statistic may be used.

$$f_3(x, c) = \frac{\left|\sum_{i=1}^{T} (x_i - \bar{x})^* \cdot (c_i - \bar{c})\right|}{\sqrt{\sum_{i=1}^{T} |x_i - \bar{x}|^2} \cdot \sqrt{\sum_{i=1}^{T} |c_i - \bar{c}|^2}} \quad (3)$$

in which $$\bar{x} = \frac{1}{T} \sum_{i=1}^{T} x_i, \text{ and} \quad (4a)$$

and $$\bar{c} = \frac{1}{T} \sum_{i=1}^{T} c_i. \quad (4b)$$

When carrier-phase tracking is not possible, a statistic based on bit-transitions may be more appropriate. In order to use the same notation as used elsewhere herein, $BT_{i,i+1}$ may be defined as $$BT_{i,i+1} = \begin{cases} 1 & c_i = c_{i+1} \\ -1 & c_i \neq c_{i+1} \end{cases} \quad (5)$$

The following statistic may be defined:

$$f_4(x, c) = \frac{\left|\sum_{i=1}^{T} x_{i+1} x_i^* \cdot BT_{i,i+1}\right|}{\sum_{i=1}^{T} |x_{i+1} x_i^*|}. \quad (6)$$

There may be a possible issue with certain bit, in which two bit-transition patterns may provide the same result in Eq. (6) due to the magnitude operation in the numerator. The following correlation statistic overcomes this issue:

$$f_5(x, c) = \frac{\left|\sum_{i=1}^{T} \text{Re}(x_{i+1} x_i^*) \cdot BT_{i,i+1}\right|}{\sum_{i=1}^{T} |\text{Re}(x_{i+1} x_i^*)|}. \quad (7)$$

When the sequences x and c do not correspond to continuous symbols, only the relevant sub-sequences that contain bit-transitions are used in Eqs. (6) and (7).

It may be observed that many correlation statistics are possible, and the correlation statistics presented herein should be considered as example embodiments, not necessarily limiting the applicability of the subject matter disclosed herein to these metrics. Other correlation metrics that offer statistical differences when applied to valid SV transmissions and spurious signals may be derived.

The correlation statistics presented so far only depend on x and c. One possible generalization may be to associate with the known-bit sequence c a reliability sequence $r = [r_1, r_2, \ldots, r_T]$ that models the reliability with which each of the known-bits (transitions) is derived. When the symbols in c are not equally reliable, r may be used to improve the correlation statistics to take into account this additional information in a deterministic function $f(x, c, r)$. For example, $r_i \in [0,1]$ may be used to denote the reliability, with $r_i = 0$ to indicate the corresponding bit should not be used, and $r_i = 1$ to indicate that the bit should be fully relied upon. Other values for the reliabilities may also be used. The correlation metric of Eq. (2) may be extended to show one example of how the reliability information may be incorporated in a correlation statistic.

$$f_6(x, c, r) = \frac{\left|\sum_{i=1}^{T} x_i^* \cdot c_i \cdot r_i^2\right|}{\sqrt{\sum_{i=1}^{T} |x_i \cdot r_i|^2} \cdot \sqrt{\sum_{i=1}^{T} |c_i \cdot r_i|^2}}. \quad (8)$$

One further generalization may be to associate another reliability sequence s to the sequence x. This reliability sequence may contain information related to the tracking-loop stability for each symbol, the carrier-to-noise-density ratio (CN0), temperature information when the clock is based on a temperature sensing crystal/digital controlled oscillator (TSX/DCXO), etc. With this generalization, the correlation statistic of Eq. (2) may be expressed as:

$$f_7(x, c, r, s) = \frac{\left|\sum_{i=1}^{T} x_i^* \cdot c_i \cdot r_i \cdot s_i\right|}{\sqrt{\sum_{i=1}^{T} |x_i \cdot s_i|^2} \cdot \sqrt{\sum_{i=1}^{T} |c_i \cdot r_i|^2}}. \quad (9)$$

While the examples given in Equations (8) and (9) refer to generalizations of Eq. (2), similar generalizations may be possible for all other correlation metrics described herein.

Detecting Spurious Transmissions

The correlation statistics, as described herein, behave differently when computed on sequences x arising from valid SV data and on random sequences x arising from spurious signals not correlated with the known bits c. The difference in statistical behavior may be used to for a detector to detect spurious signals from real SV signals.

Detection after Frame Synchronization

For simplicity of presentation, it is initially assumed herein that the sequence x may be obtained after the corresponding SV track has achieved frame synchronization (FS). Frame synchronization algorithms, such as WFS, EWFS, etc., may be used to achieve a frame synchronization state. Typically, frame synchronization information may be correlated across channels (SVs) so the frame synchronization of one channel may be derived from the frame synchronization information from another channel (typically a stronger SVs having a higher CN0). Some algorithms combine information across several SVs (channels) to increase the reliability of the frame synchronization process. The description of frame synchronization algorithms may be beyond the scope of the disclosure herein, noting that it may be assumed that a suitable frame synchronization algorithm or algorithms may be used to achieve adequate frame synchronization prior to the use of the technology described herein. An extension is presented below that allows using sequences x obtained prior to achieving full frame synchronization status. As a result, involving frame synchronization prior to spurious SV detection should only be considered temporary for ease of presentation.

Detection of spurious transmissions may be framed as a general detection problem between two hypotheses: H0 (the signal is from a valid SV), and H1 (the signal is spurious). Typically, detectors use a threshold test in which a suitable statistic of the random variables may be compared to a threshold. The correlation metrics described herein are used as a threshold test as follows:

$$f(x, c, r, s) \begin{cases} \geq \tau & \text{decide valid } SV \\ < \tau & \text{decide invalid } SV \end{cases} \quad (10)$$

In the simplest form, the threshold $\tau$ may be a tunable, but a fixed constant may be selected appropriately to balance the error probabilities (false alarm and misdetection) of the detector for a desired application. The value of $\tau$ may be tuned via simulations, or experimentally by optimizing a desired Key Performance Indicator (KPI). One example application using the detector disclosed herein may be to improve the performance in Mobile Station Assisted (MSA) tests. In such tests, the Device Under Test (DUT) sometimes fails because an invalid SV is reported to a test box as valid, or in other cases, not enough SVs are reported (perhaps due to incorrect removal of valid SVs). For this example, $\tau$ may be selected to optimize the passing rate in the MSA test.

The choice of $\tau$ may also or alternatively depend on other techniques being used to detect spurious signals, or other spurious signal mitigation strategies (such as CWTC, blanking, etc.). In general, $\tau$ may be a function of several parameters, such as but not limited to, the number of SVs tracked, the number of bit (transitions) T, the CN0 of the signal, the uncertainty of FS (which may not be fully reliable), soft information obtained from other checks (like CW checks, side-lobe checks, etc.), CW activity, temperature dynamics, etc. Other parameters may be used to configure the detection threshold.

Detection Before Frame Synchronization

Before frame synchronization is achieved, a GNSS receiver may have some timing uncertainty that depends on the amount of prior information or aiding information the GNSS receiver has. The timing uncertainty may be represented by an uncertainty window W, which is the set of timing offsets that may contain a frame boundary. As frame synchronization progresses, the timing uncertainty W may be reduced, ultimately becoming a singleton after full frame synchronization is achieved. Above, it was assumed that the spurious signal detector based on known-bits is used after full frame synchronization has been achieved. In practice, full frame synchronization may take a few seconds, and ignoring the signals during this time in the detector may be detrimental to the overall system performance.

Herein, the correlation statistics may be computed for each possible timing offset in the uncertainty window W. The values and offsets may be saved, and once frame synchronization has been achieved, only the statistic associated with offset corresponding to the frame synchronization value is ultimately used in the threshold check. As the uncertainty window W is reduced, the statistics computed for offsets outside the new uncertainty window may be rendered invalid and discarded.

An alternative embodiment that may save memory may store only the top K correlation metrics in the uncertainty window W in which K is selected based on the available memory. After frame synchronization has been achieved, it may happen that the correlation metric associated with the correct frame synchronization offset was discarded, in which case no threshold test may be performed, and the decision to use or discard the channel may be based on other algorithms.

Extending the Metric to Various Sub-Frames

The description of the known-bits (known-bit-transitions) above was sufficiently general to allow use of known-bits that span multiple sub-frames, and the same sub-frames in multiple frame transmissions. All that is involved may be to have received the corresponding known bits by the time that the decision of the test above is made. Depending on the timing of the signals and a goal of providing a GNSS solution by a given time, it may or may not be possible to use known-bits from multiple frames. One option may be to delay making a decision until the last possible moment (e.g., when the information is to be reported to a test box in a MSA test to avoid timing out), and to make the decision via a threshold test using all available known bits at that time (using the appropriate threshold for the T used).

Another option may be to have two thresholds to determine whether the signal should be directly accepted or rejected based on the given number of known bits, and to possibly defer a decision to future data collection based on the correlation statistic falling between the thresholds.

Block Diagram

FIG. 4 is a block diagram of an example embodiment of a detector 400 for a GNSS receiver that detects spurious signals using known bits in the GNSS data stream according to the subject matter disclosed herein. In one embodiment, the detector 400 may be part of the HW/SW signal processing circuit 104 of the GNSS receiver 100 depicted in FIG. 1. The detector 400 may include circuitry 401 that determines known bits and/or known-bit transitions, a correlator engine circuit 402, a correlation statistic circuit 403, a detection threshold determination circuit 404, and a spurious signal detector circuit 405.

The circuitry 401 that determines known bits and/or known-bit transitions may determine the known bits c or known-bit transitions that will be used in the correlation statistic circuit 403. As described herein, the known bits may be fixed or may be determined using external information (not shown in FIG. 4). Examples of the known bits include, but are not limited to, the TLM and HOW words in a SV signal. Additionally, the circuitry 401 may generate a reliability metric r associated with the known bits, as disclosed herein.

The correlation engine circuit 402 may generate a received sequence x and possibly an associated reliability sequence s, as disclosed herein. Generation of the received sequence may involve other receiver blocks, such as but not limited to tracking loops, correlators, etc.

The correlation statistic circuit 403 may use x, and c, and possibly r and s to generate a correlation statistic $f(x, c, r, s)$, as described herein.

The detection threshold determination circuit 404 may determine a detection threshold $\tau$ that is used by the spurious signal detector circuit 405. As described herein, the determination of the detection threshold may involve different choices depending on a performance metric being optimized and for which other spurious signal detection checks may be used. Additionally, the threshold determination may involve use of information, such as but not limited to, the number of SVs being tracked, the number of bit (transitions) T, the CN0 of the tracked signal, an uncertainty of frame synchronization (which may not be fully reliable), soft information obtained from other checks (like CW checks, side-lobe checks, etc.), CW activity, temperature dynamics, etc.

The spurious signal detector circuit 405 may use a threshold test on $f(x, c, r, s)$ using the threshold $\tau$ to make a decision whether the SV signal under consideration is spurious or a valid GNSS transmission. This decision may be used by the GNSS receiver system and possibly combined with information generated by other blocks (not shown) to determine whether to terminate tracking of the SV signal, and/or report the measurement to other blocks (either internal or external to the receiver) as valid.

Figure 5:
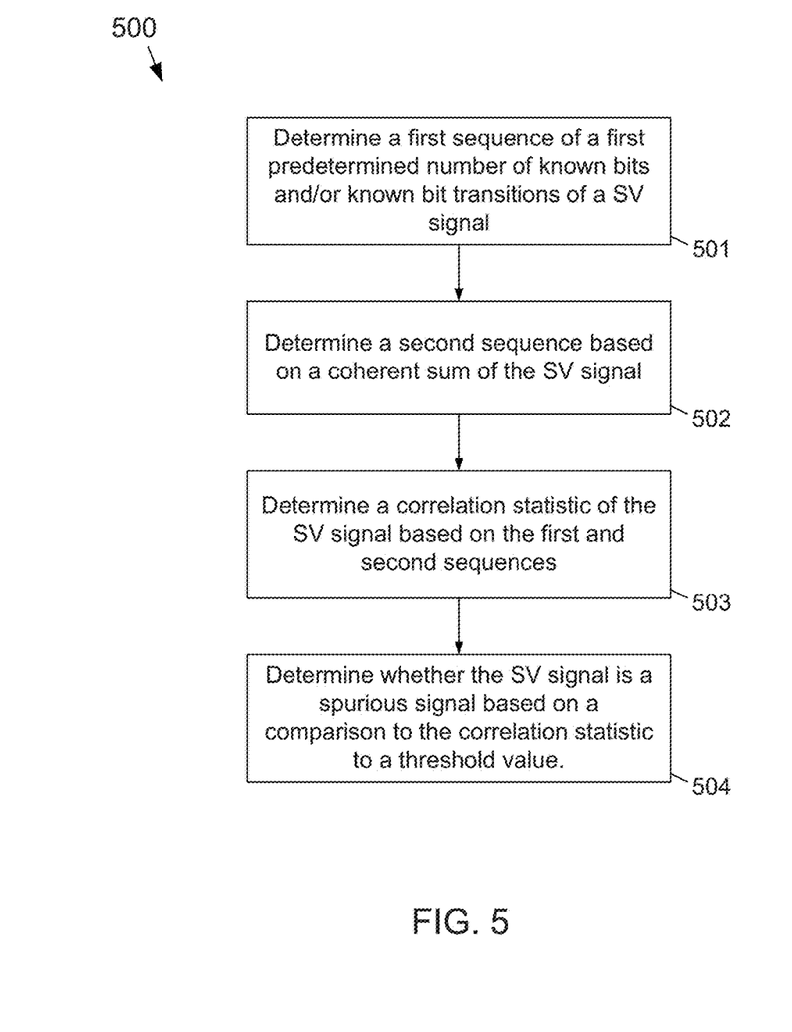
FIG. 5 is a flowchart for an example method for detecting spurious signals using known bits in the GNSS data stream according to the subject matter disclosed herein.

FIG. 5 is a flowchart for an example method 500 for detecting spurious signals using known bits in the GNSS data stream according to the subject matter disclosed herein. At 501, a detector of a GNSS receiver may determine a first sequence of a first set of known bits or known-bit transitions of a SV signal of a target SV. In one embodiment, the known bits or known-bit transitions may include the Telemetry (TLM) and the Handover Word (HOW) words of a current subframe of the SV signal. In another embodiment, the known bits or known-bit transitions may further include at least one bit or bit transition of a parity field of a subframe immediately preceding the current subframe of the SV signal. In still another embodiment, the known bits or known-bit transitions may span multiple subframes of the SV signal. In one embodiment, the signal processing circuit may determine a first reliability sequence associated with the first sequence.

At 502, a correlator circuit of the detector may determine a second sequence, which in one embodiment may be a complex sequence. In one embodiment, the second sequence may contain one or more coherent sums of the SV signal being tracked by the GNSS receiver. Multiple coherent sums may be used to represent a plurality of coherent sums occurring over multiple time periods, for example, a plurality of 20 ms periods in which each period corresponds to a single coherent sum. In another embodiment, the correlator circuit may also determine a second reliability sequence that is associated with the second sequence.

At 503, the detector may determine a correlation statistic of the SV based on the first sequence and the second sequence. In one embodiment, the correlation statistic may also be based on the first reliability sequence and/or the second reliability sequence.

At 504, the detector may determine whether the SV signal is a spurious signal based, at least in part, on a comparison of the correlation statistic to a threshold value. The threshold value may be based on the number of SVs being tracked by the GNSS receiver, the number of known bits or bit transitions, a carrier-to-noise-density ratio (CN0) of the SV signal of the target SV, an uncertainty of a frame synchronization, information obtained from other spurious signal checks performed by the GNSS receiver, continuous wave activity, and temperature dynamics, or a combination thereof.

Figure 6:
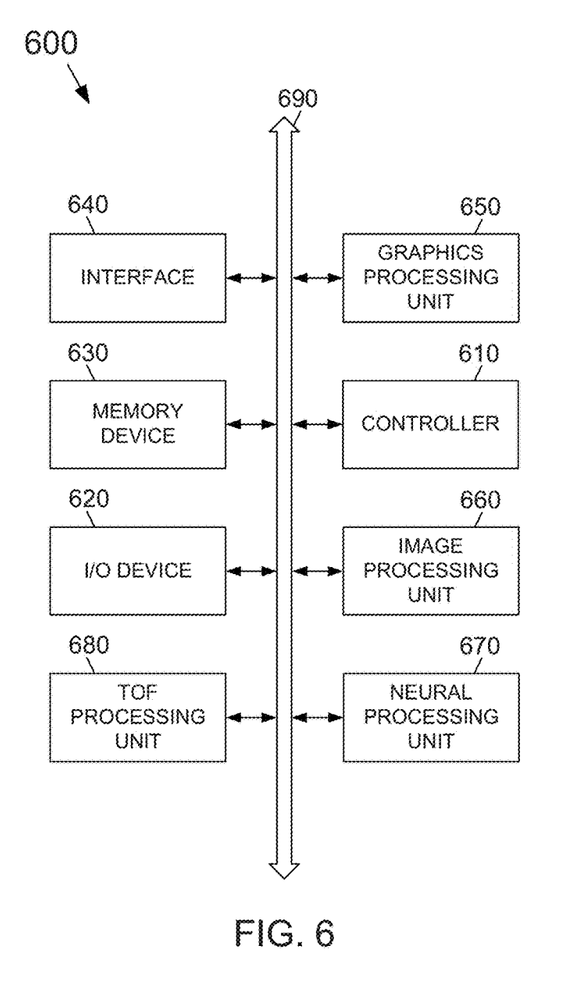
FIG. 6 depicts an electronic device that in one embodiment may include a GNSS receiver having a detector that verifies a GNSS SV signal based on known-bit patterns of an SV signal.

FIG. 6 depicts an electronic device 600 that in one embodiment may include a GNSS receiver having a detector that verifies a GNSS SV signal based on known-bit patterns of an SV signal. The electronic device 600 may include a controller (or CPU) 610, an input/output device 620 such as, but not limited to, a keypad, a keyboard, a display, a touch-screen display, a 2D image sensor, a 3D image sensor, a memory 630, an interface 640, a GPU 650, an imaging-processing unit 660, a neural processing unit 670, a TOF processing unit 680 that are coupled to each other through a bus 690. The controller 610 may include, for example, at least one microprocessor, at least one digital signal processor, at least one microcontroller, or the like. The memory 630 may be configured to store a command code to be used by the controller 610 and/or to store a user data.

The interface 640 may be configured to include a wireless interface that is configured to transmit data to or receive data from, for example, a wireless communication network using a RF signal. In another embodiment, the interface 640 may include a GNSS receiver having a detector that verifies a GNSS SV signal based on known-bit patterns of an SV signal. The interface 640 may also include, for example, an antenna. The electronic device 600 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to detect a spurious signal in a Global Navigation Satellite System (GNSS) receiver, the method comprising:
   determining, by a detector circuit of the GNSS receiver, a first sequence comprising known-bit data of a space vehicle (SV) signal of a target SV being tracked by the GNSS receiver;
   determining, by the detector circuit, a second sequence based on multiple coherent sums of the SV signal;
   generating, by the detector circuit, a correlation statistic of the first sequence based, at least in part, on the second sequence; and
   verifying, by the detector circuit, whether the SV signal is a spurious signal based, at least in part, on a comparison of the correlation statistic to a threshold value.

2. The method of claim 1, wherein determining the first sequence further comprises determining, by the detector circuit, a first reliability sequence associated with the first sequence, and
   wherein generating the correlation statistic is further based, at least in part, on the first reliability sequence associated with the first sequence.

3. The method of claim 2, wherein determining the second sequence further comprises determining, by the detector circuit, a second reliability sequence that is associated with the second sequence, and
   wherein generating the correlation statistic is further based, at least in part, on the second reliability sequence.

4. The method of claim 1, wherein the known-bit data comprises one or more of known bits or known-bit transitions.

5. The method of claim 1, wherein the threshold value is based at least in part on one or more of a number of SVs being tracked by the GNSS receiver, the known-bit data, a carrier-to-noise-density ratio (CN0) of the SV signal of the target SV, an uncertainty of a frame synchronization, information obtained from other spurious signal checks performed by the GNSS receiver, continuous wave activity, or temperature dynamics.

6. The method of claim 1, wherein the known-bit data comprises Telemetry (TLM) and a Handover Word (HOW) words of a current subframe of the SV signal.

7. The method of claim 6, wherein the known-bit data further comprises known-bit data of a parity field of a subframe immediately preceding the current subframe of the SV signal.

8. The method of claim 1, wherein the known-bit data corresponds to multiple subframes of the SV signal.

9. A Global Navigation Satellite System (GNSS) receiver, comprising:
   a front end circuit configured to receive a plurality of space vehicle (SV) signals; and
   a detector circuit configured to:
      determine a first sequence comprising known-bit data of a space vehicle (SV) signal of a target SV being tracked by the GNSS receiver;
      determine a second sequence based on multiple coherent sums of the SV signal;
      generate a correlation statistic of the first sequence based, at least in part, on the second sequence; and
      verify that the SV signal is a spurious signal based, at least in part, on a comparison of the correlation statistic to a threshold value.

10. The GNSS receiver of claim 9, wherein the detector circuit is further configured to:
    determine a first reliability sequence associated with the first sequence, and
    generate the correlation statistic further based, at least in part, on the first reliability sequence associated with the first sequence.

11. The GNSS receiver of claim 10, wherein the detector circuit is further configured to:
    determine a second reliability sequence that is associated with the second sequence, and
    generate the correlation statistic further based, at least in part, on the second reliability sequence.

12. The GNSS receiver of claim 9, wherein the known-bit data comprises one or more of known bits that are not contiguous in the SV signal or known-bit transitions that are not contiguous in the SV signal.

13. The GNSS receiver of claim 9, wherein the threshold value is based at least in part on one or more of a number of SVs being tracked by the GNSS receiver, the known-bit data, a carrier-to-noise-density ratio (CN0) of the SV signal of the target SV, an uncertainty of a frame synchronization, information obtained from other spurious signal checks performed by the GNSS receiver, continuous wave activity, or temperature dynamics.

14. The GNSS receiver of claim 9, wherein the known-bit data comprises Telemetry (TLM) and a Handover Word (HOW) words of a current subframe of the SV signal.

15. The GNSS receiver of claim 14, wherein the known-bit data further comprises at least one bit or bit transition of a parity field of a subframe immediately preceding the current subframe of the SV signal.

16. The GNSS receiver of claim 9, wherein the known-bits data corresponds to multiple subframes of the SV signal.

17. A detector circuit for a Global Navigation Satellite System (GNSS) receiver, the detector circuit comprising:
- a processor; and
- one or more computer-readable storage mediums storing a set of executable computer-program instructions, the set of executable computer-program instructions, when executed by the processor, causes the processor to:
  - determine a first sequence comprising known-bit data of a space vehicle (SV) signal of a target SV being tracked by the GNSS receiver;
  - determine a second sequence based on multiple coherent sums of the SV signal;
  - generate a correlation statistic of the first sequence based, at least in part, on the second sequence; and
  - verify whether the SV signal is a spurious signal based, at least in part, on a comparison of the correlation statistic to a threshold value.

18. The detector circuit of claim 17, wherein determining the first sequence further comprises determining, by the detector circuit, a first reliability sequence associated with the first sequence, and
- wherein generating the correlation statistic is further based, at least in part, on the first reliability sequence associated with the first sequence.

19. The detector circuit of claim 18, wherein determining the second sequence further comprises determining, by the detector circuit, a second reliability sequence that is associated with the second sequence, and
- wherein generating the correlation statistic is further based, at least in part, on the second reliability sequence.

20. The detector circuit of claim 17, wherein the known-bit data comprises one or more of known bits or known-bit transitions.

* * * * *